(12) United States Patent
Veigas et al.

(10) Patent No.: US 12,646,917 B2
(45) Date of Patent: Jun. 2, 2026

(54) WILDLIFE GUARD ASSEMBLIES AND METHODS FOR USING SAME

(71) Applicant: TE Connectivity Solutions GmbH, Schaffhausen (CH)

(72) Inventors: Amith Ben Veigas, Bangalore (IN); Vinayak G. Patil, Bangalore (IN); Laura Jackson Hiller, Fuquay-Varina, NC (US); Supreet Banaji, Bangalore (IN); Benjamin Guardiola, Fuquay-Varina, NC (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 171 days.

(21) Appl. No.: 18/641,794

(22) Filed: Apr. 22, 2024

(65) Prior Publication Data
US 2025/0330006 A1 Oct. 23, 2025

(51) Int. Cl.
*H02G 7/00* (2006.01)
*A01M 29/30* (2011.01)
*H02G 1/02* (2006.01)

(52) U.S. Cl.
CPC .............. *H02G 7/00* (2013.01); *A01M 29/30* (2013.01); *H02G 1/02* (2013.01)

(58) Field of Classification Search
CPC ...... H01B 19/00; H01B 17/00; H01B 17/005; H01B 17/56; H01B 17/26; H01B 7/00; H01B 17/583; H01B 17/38; H02G 7/00; H02G 1/02; H02G 3/081; H05K 5/03; H05K 5/02; H01R 4/70; A01M 29/00; A01M 29/32; A01M 29/30; H01H 31/006; H01H 31/22; H01H 31/127

USPC ......... 174/152 G, 153 G, 135, 152 R, 138 R, 174/139, 138 F, 137 R, 5 R, 140 H, 5 SB; 337/202; 361/232
See application file for complete search history.

(56) References Cited

U.S. PATENT DOCUMENTS

| | | | | |
|---|---|---|---|---|
| 3,016,034 A | * | 1/1962 | Raistakka ............... | B63B 21/12 114/221 R |
| 5,679,922 A | * | 10/1997 | Harben .................... | H02G 7/00 174/138 R |
| 5,682,015 A | * | 10/1997 | Harben .................... | H02B 1/06 174/138 R |
| 5,834,686 A | * | 11/1998 | Barrett ................... | H01B 17/50 174/138 F |
| 6,248,956 B1 | * | 6/2001 | Cook ....................... | H02G 7/00 174/154 |
| 6,255,597 B1 | * | 7/2001 | Bowling ............... | H01B 17/00 174/138 F |

(Continued)

OTHER PUBLICATIONS

Partial European Search Report, European Application No., 25171156.0-1201, European Filing Date. Jan. 15, 2026.

*Primary Examiner* — Angel R Estrada

(57) ABSTRACT

The present disclosure describes a wildlife guard assembly for a power distribution line insulator. The wildlife guard assembly includes a first cover member pivotably coupled to a second cover member about a fastener. The first cover member includes a locking mechanism configured to engage with the second cover member to secure the first and second cover members in position when installed on the power distribution line insulator. Other wildlife guard assemblies and methods of installing a wildlife guard assembly on a power distribution line insulator are also described herein.

20 Claims, 15 Drawing Sheets

(56)     References Cited

U.S. PATENT DOCUMENTS

| | | | |
|---|---|---|---|
| 6,291,774 B1 * | 9/2001 | Williams | H01B 17/00 |
| | | | 174/138 R |
| 7,309,837 B1 * | 12/2007 | Rauckman | H01B 17/00 |
| | | | 174/138 F |
| 7,622,668 B1 * | 11/2009 | Tollefson | H01B 17/00 |
| | | | 174/138 F |
| 8,115,102 B2 * | 2/2012 | Frye | H01B 17/00 |
| | | | 361/604 |
| 8,957,314 B2 * | 2/2015 | Niles | H02G 7/00 |
| | | | 174/172 |
| 2019/0066885 A1 | 2/2019 | Ma et al. | |

\* cited by examiner

10

10'

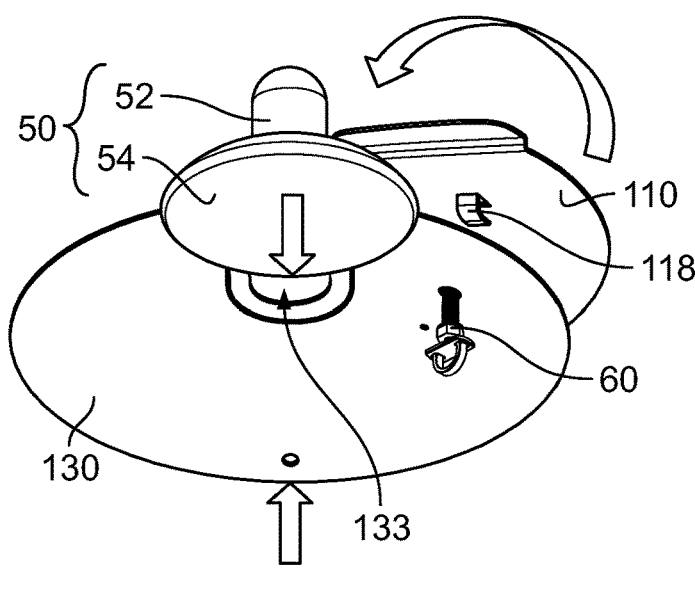
Fig. 5D
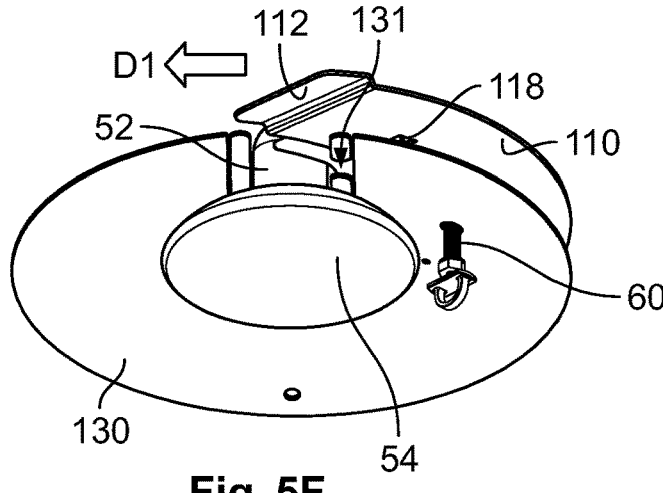
Fig. 5E
Fig. 5F

WILDLIFE GUARD ASSEMBLIES AND METHODS FOR USING SAME

FIELD

The present invention relates to protective guards, and more particularly, to wildlife guards for power distribution lines and associated insulators.

BACKGROUND

When electrical equipment, such as power transmission lines, insulators, surge arrestors, switchgear and transformers (e.g., operating at voltages in excess of 1 kV and particularly in excess of 10 kV, such voltages hereinafter being referred to as "high voltage"), often have parts thereof or parts associated therewith that are not insulated from the surrounding air. Thus, an exposed portion of such equipment can be at high voltage and be longitudinally separated from another portion at low voltage, for example at earth potential. The exposed high voltage portion may be physically supported by an insulator, for example when an overhead power line is mounted on an insulator that spaces it from a supporting tower that is itself at earth potential, or for example when a high voltage cable is terminated at a bushing or switchgear whose metal housing is at earth potential. In such instances outdoors, fecal or other soluable contaminates from larger wildlife such as squirrels and birds can form an electrical short circuit between the high voltage equipment and earth potential, often with serious consequences for the electrical equipment and the supply of electrical power-usually at least a fuse is actuated or a circuit breaker triggered such that the power supply is interrupted.

Typically, a wildlife guard includes one or more parts forming a disk with an aperture. The wildlife guard is mounted on an insulator (e.g., between sheds) such that the disc extends radially outwardly from the insulator beyond the sheds. It is desirable that a wildlife guard be securely mounted on an insulator once installed. Wildlife guards 10, 10' of known design (see, e.g., FIGS. 1A-1B) may be difficult or cumbersome to install on elevated insulators by an installer situated on the ground using a hot-stick, for example. During most installations, the wildlife guards 10, 10' require two technicians using two hot-sticks simultaneously to position and secure the guards 10, 10' on the insulator.

SUMMARY

Embodiments of the present invention are directed to a wildlife guard assembly for a power distribution line insulator. The wildlife guard assembly includes a first cover member having an actuator portion configured to receive a portion of the power distribution line insulator and a closure portion and a second cover member pivotably coupled to the first cover member, The second cover member has an elongate slot extending from an outer edge toward a center, the elongate slot configured to receive the portion of the power distribution line insulator. The assembly is configured to receive the power distribution line insulator such that, when the portion of the power distribution line insulator is slid within the elongate slot of the second cover member and engages the actuator portion of the first cover member, the first cover member moves in a first direction relative to the second cover member until the closure portion overlaps the second cover member to secure the assembly on the power distribution line insulator.

Further embodiments of the present invention are directed to a wildlife guard assembly for a power distribution line insulator. The wildlife guard assembly includes a first cover member having a recessed area configured to receive a portion of the power distribution line insulator. The first cover member includes a coupling component and a locking mechanism extending downwardly therefrom. The wildlife guard assembly further includes a second cover member coupled to the first cover member. The second cover member has an elongate slot extending from an outer edge toward a center, the elongate slot configured to receive the portion of the power distribution line insulator. The second cover member includes an aperture aligned with the coupling component of the first cover member and a hot-stick feature configured to engage a hot-stick during installation. The wildlife guard assembly further includes a fastener extending through the aperture of the second cover member and engaged with the coupling component of the first cover member. The fastener defines a pivot point which allows the first cover member to move in a first direction relative to the second cover member to secure the assembly on the power distribution line insulator.

Further embodiments of the present invention are directed to a method for installing a wildlife guard assembly onto a power distribution line insulator. The wildlife guard assembly includes a first cover member pivotably coupled to a second cover member, the first cover member having a recessed area and the second cover member having an elongate slot. The method includes aligning a top end of the power distribution line insulator with an opening of the elongate slot of the second cover member; using a hot-stick, pushing the wildlife guard assembly such that the top end of the power distribution line insulator is received within the elongate slot of the second cover member and engages the first cover member within the recessed area; continuing to push the wildlife guard assembly such that the first cover member moves in a first direction relative to the second cover member until a locking mechanism of the first cover member engages an inner edge of the elongate slot of the second cover member; and securing the second cover member to the first cover member with a fastener to secure the wildlife guard assembly on the power distribution line insulator.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 5A-5L illustrate operation of installing the wildlife guard assembly of FIGS. 2A-2B onto a power distribution line insulator from a bottom perspective according to embodiments of the present invention.

Figures 6A, 6B:
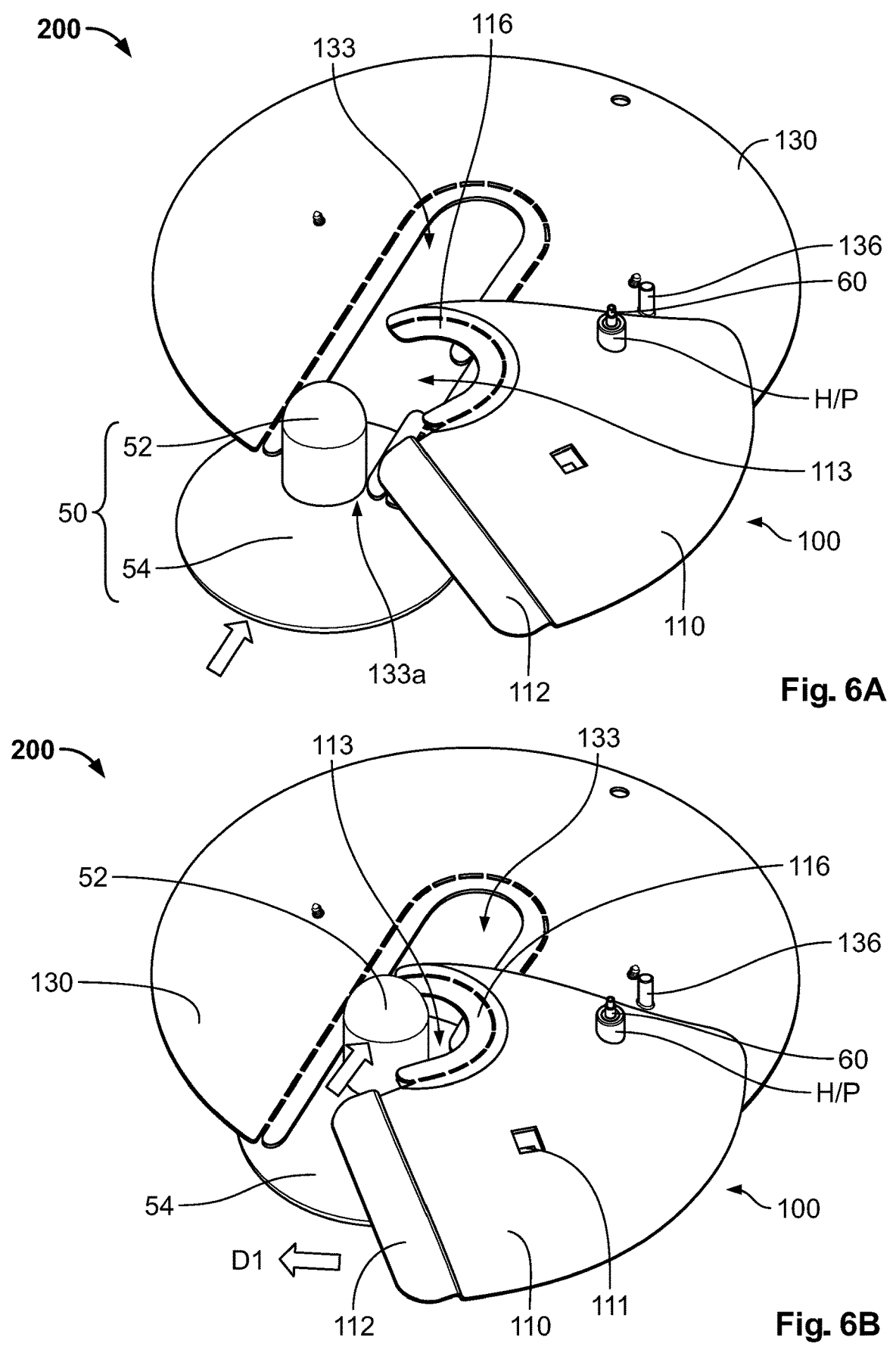

FIGS. 6A-6D illustrate operation of installing the wildlife guard assembly of FIGS. 2A-2B onto a power distribution line insulator from a top perspective according to embodiments of the present invention.

DETAILED DESCRIPTION

Figure 1A:
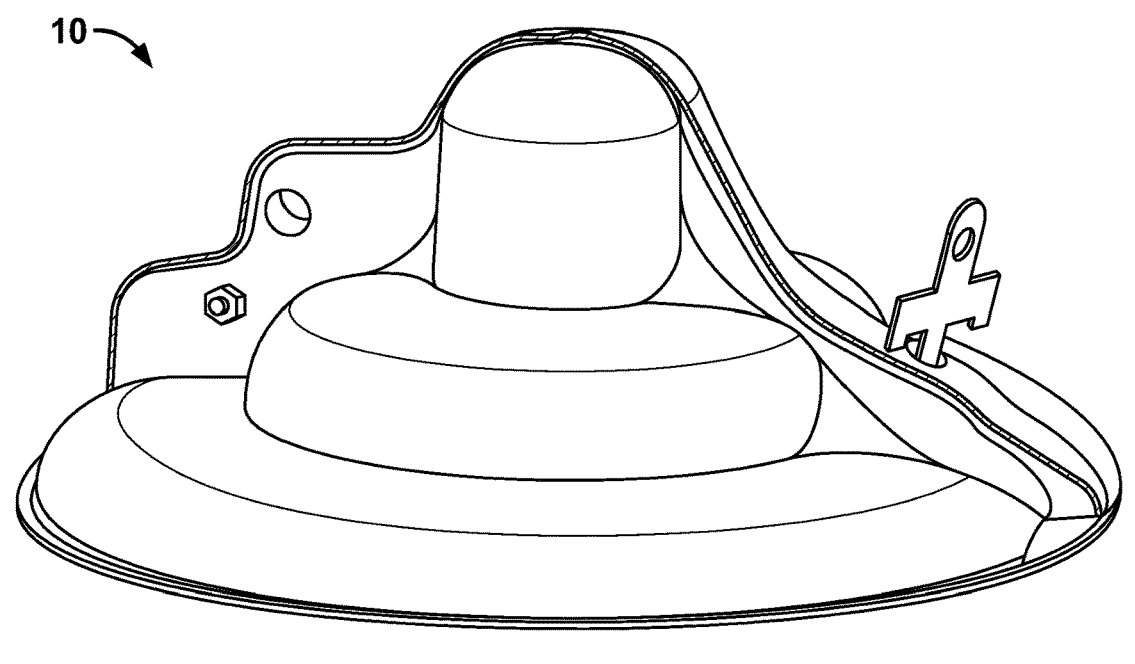
FIGS. 1A-1B illustrate known wildlife guards for power distribution lines and associated insulators.
Figure 1B:
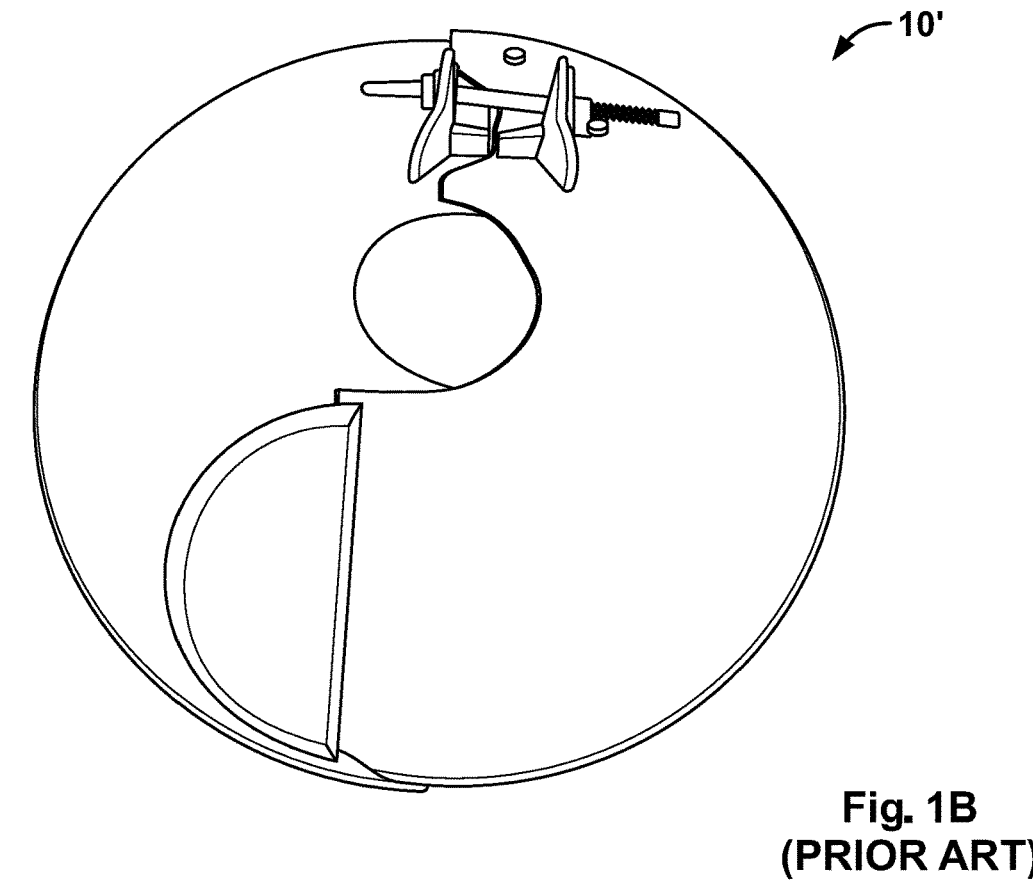

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention are directed to a wildlife guard assembly for power distribution lines and associated insulators. According to embodiments of the present invention, the wildlife guard assembly may be installed onto a power distribution line insulator by one technician using a single hot-stick. Thus, the wildlife guard assembly of the present invention may provide for easier installation at a reduced cost. Embodiments of the present invention will now be discussed in greater detail below with reference to FIGS. 2A-6.

Referring to FIGS. 2A-2D, a wildlife guard assembly 100 according to embodiments of the present invention is illustrated. As shown in FIGS. 2A-2D, in some embodiments, the wildlife guard assembly 100 comprises a first (or an upper) cover member 110 and a second (or a lower) cover member 130. The first cover member 110 is coupled to the second cover member 130. In some embodiments, the first cover member 110 is pivotably coupled to the second cover member 130. In some embodiments, the first and second cover members 110, 130 together define a central opening 102 that is sized and configured to receive a top end (or end cap) 52 of a power distribution line insulator 50. In other words, when installed, the assembly 100 is configured to surround the top end or end cap 52 of the power distribution line insulator 50 (i.e., the assembly 100 is in a closed configuration). In some embodiments, the first and/or second cover member 110, 130 may be formed from a polymer material. For example, in some embodiments, the first and/or second cover member 110, 130 may be formed from a plastic. In some embodiments, the first and/or second cover members 110, 130 may be formed from metal.

As described in further detail below, to secure the wildlife guard assembly 100 to the power distribution line insulator 50, in some embodiments, the first cover member 110 is configured to slide, pivot or otherwise move relative to the second cover member 130 until a locking mechanism 118 of the first cover member 110 engages an inner edge (or a corresponding recessed section 131) of an elongate slot 133 of the second cover member 130. As shown in FIGS. 2A-2D, in some embodiments, when the wildlife guard assembly 100 of the present invention is mounted on a power distribution line insulator 50 and in the closed configuration, the first and second cover members 110, 120 together form a disc that extends radially outwardly from the end cap 52 of the insulator 50 (and beyond the sheds 54).

Figure 3A:
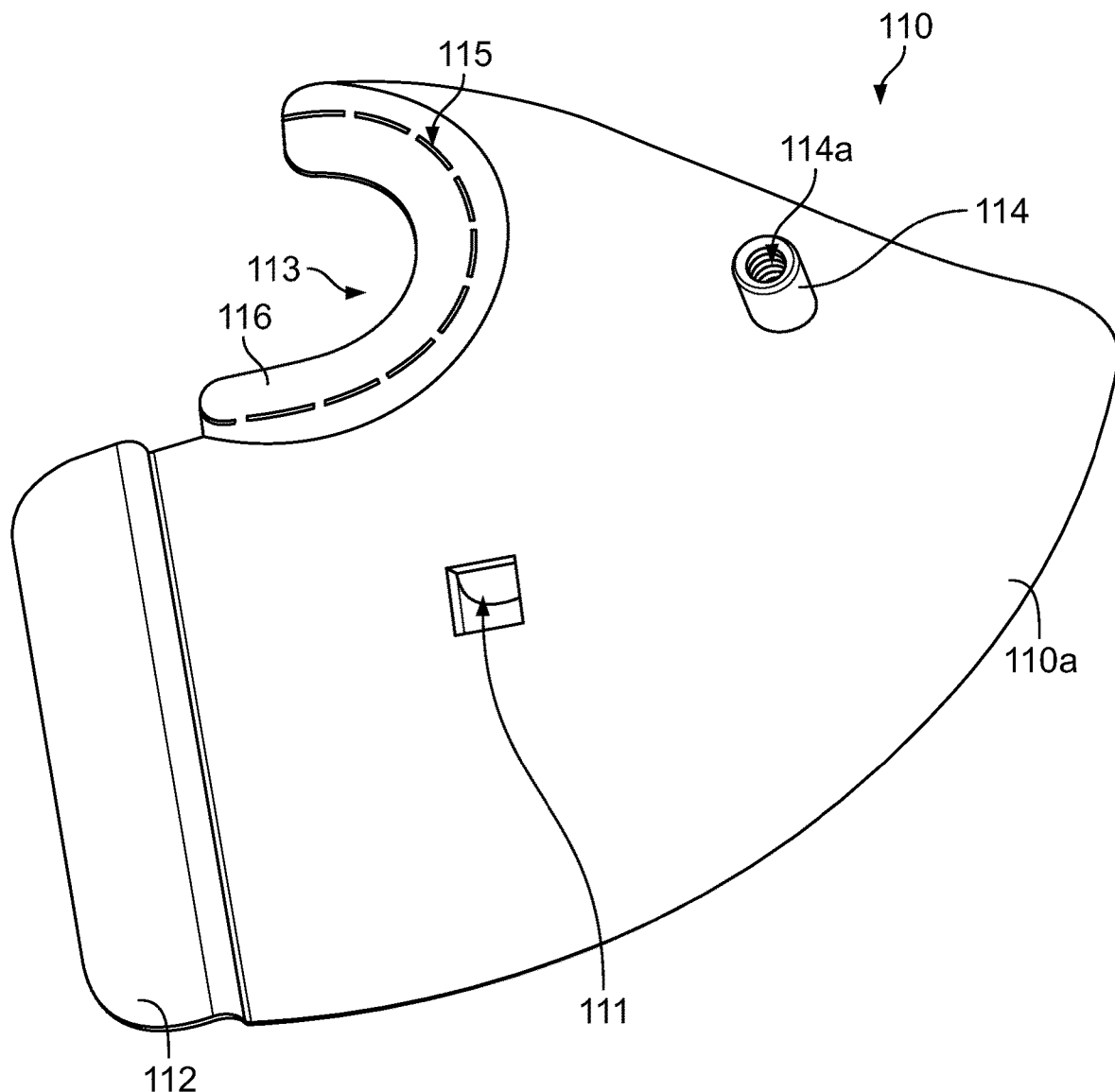
FIG. 3A is a top perspective view of a top cover member for the wildlife guard assembly of FIGS. 2A-2B.
Figures 3B, 3C:
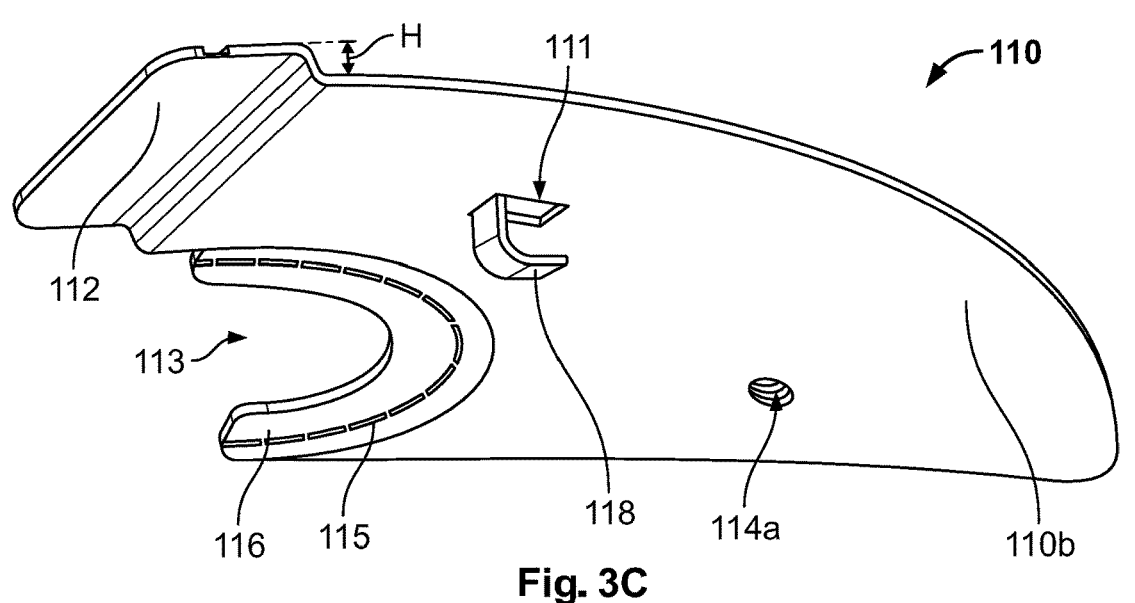
FIG. 3B is a top view of the top cover member of FIG. 3A.
FIG. 3C is a bottom perspective view of the top cover member of FIG. 3A.

Referring to FIGS. 3A-3C, the first (upper) cover member 110 of the wildlife guard assembly 100 of the present invention is shown in greater detail. The first cover member 110 has an outer (upper) surface 110*a* and an inner (lower) surface 110*b*. As shown in FIGS. 3A-3C, in some embodiments, the first cover member 110 includes an actuator portion 116. The actuator portion 116 is configured to engage with a top end or end cap 52 of a power distribution line insulator 50 when being installed thereon. For example, in some embodiments, the actuator portion 116 may comprise a recessed area 113. The recessed area 113 is sized and configured to receive at least a portion of the top end or end cap 52 of the insulator 50. In some embodiments, the recessed area 113 has an arcuate shape (e.g., C-shaped or U-shaped). In some embodiments, the first cover member 110 may comprise a frangible or breakable connection adjacent to the recessed area 113 of the actuator portion 116. For example, the actuator portion 116 may comprise a plurality of serrations 115. In some embodiments, the plurality of serrations 115 allows a segment of the actuator portion 116 of the first cover member 110 to be removed to increase the size (e.g., radius) of the recessed area 113, thereby allowing the assembly 100 to accommodate different sizes of insulators 50. For example, a technician may cut along the plurality of serrations 115 to create a larger recessed area 113 to accommodate a larger diameter end cap 52.

As shown in FIGS. 3A-3B, the upper surface 110a of the first cover member 110 comprises a coupling component 114. In some embodiments, the coupling component 114 may extend outwardly from the upper surface 110a of the first cover member 110. In some embodiments, the coupling component 114 may be integrally formed with the upper surface 110a of the first cover member 110. In some embodiments, the coupling component 114 forms an opening 114a in the first cover member 110. The opening 114a is sized and configured to receive a fastener 60 that will secure the second cover member 130 to the first cover member 110 (see, e.g., FIGS. 2A-2B). In some embodiments, the fastener 60 may have a ring 62 at one end to help with a technician's grip on the fastener 60. As discussed further below, the fastener 60 will also form a hinge and pivot point H/P between the first cover member 110 and the second cover member 130 which will allow the first cover member 110 to move relative to the second cover member 130. In some embodiments, the coupling component 114 may comprise internal threads configured to mate with the fastener 60 (e.g., a threaded bolt). The internal threads of the coupling component 114 may also help pull the second cover member 130 toward the first cover member 110 as the fastener 60 is tightened.

As shown in FIGS. 3A-3C, in some embodiments, the first cover member 110 may further comprise a closure portion having flanged edge 112. In some embodiments, the flanged edge 112 is axially offset a distance H outwardly relative to the outer surface 110a of the first cover member 110. As described in further detail below, the offset distance H of the flanged edge 112 positions the corresponding end of the first cover member 110 on a different plane relative to an end of the second cover member 130, thereby allowing for easier engagement with the second cover member 130 as the first cover member 110 is moved/slid/pivoted relative to the second cover member 130 during installation of the assembly 100 on a power distribution line insulator 50. In addition, the flanged edge 112 creates an overlap of at least a portion of the first cover member 110 with at least a portion the second cover member 130 when the assembly 100 is in the closed configuration (see, e.g., FIGS. 5G-5I), thereby providing additional structural support to the assembly 100 when installed on the insulator 50.

As shown in FIG. 3C, and discussed above, the first cover member 110 further comprises a locking mechanism 118 extending downwardly from the inner surface 110b. In some embodiments, the locking mechanism 118 may be an L-shaped hook or latch. In some embodiments, the locking mechanism 118 may extend downwardly through an aperture 111 in the first cover member 110. In some embodiments, the locking mechanism 118 is coupled to or integral with the first cover member 110. As discussed in further detail below, the locking mechanism 118 and the flanged edge 112 of the first cover member 110 may together form an interlocking mechanism that engages with the second cover member 130 to secure the wildlife guard assembly 100 to a power distribution line insulator 50 (see, e.g., FIGS. 5G-5L).

Figure 4A:
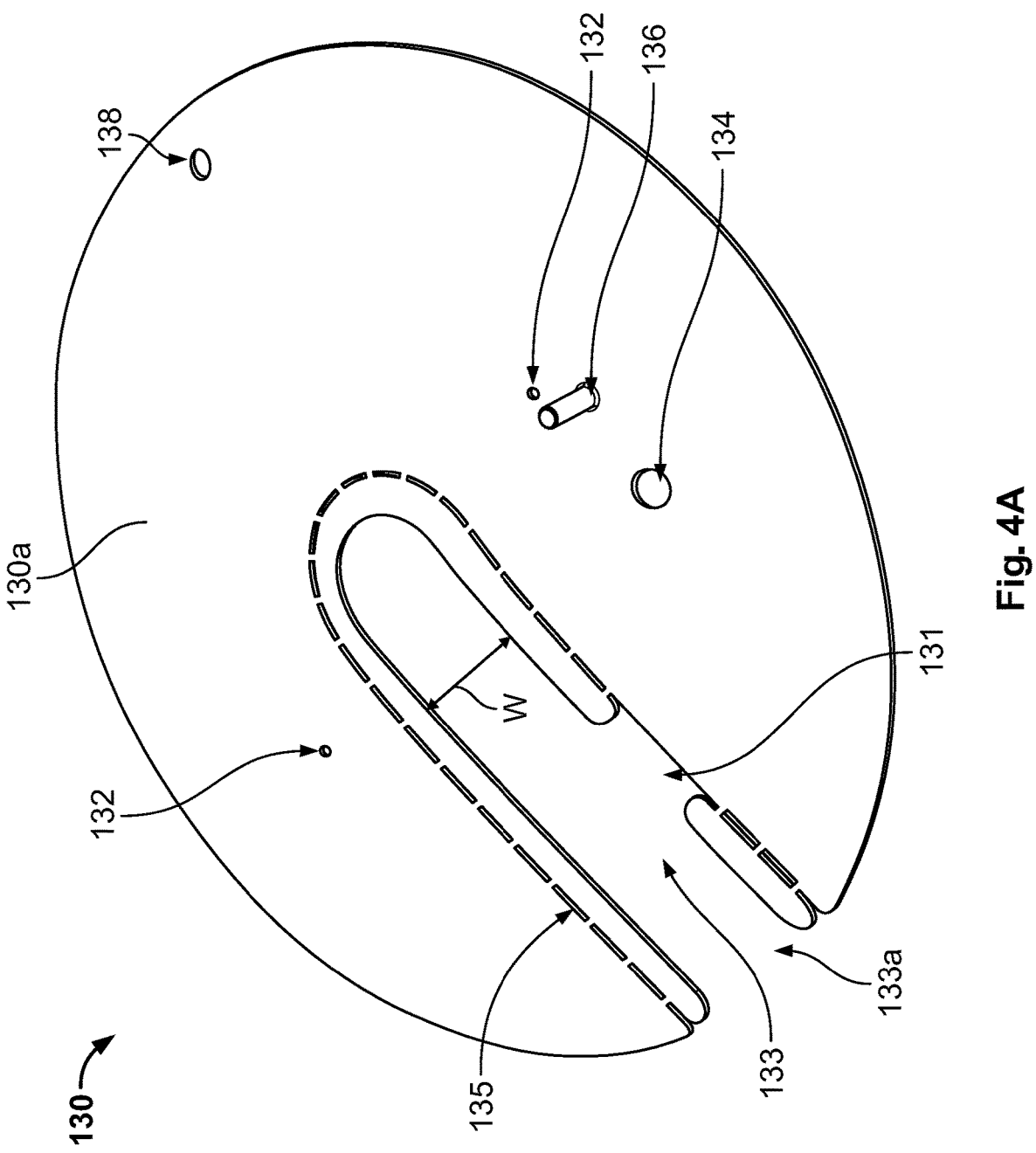
FIG. 4A is a top perspective view of a bottom cover member for the wildlife guard assembly of FIGS. 2A-2B.
Figure 4B:
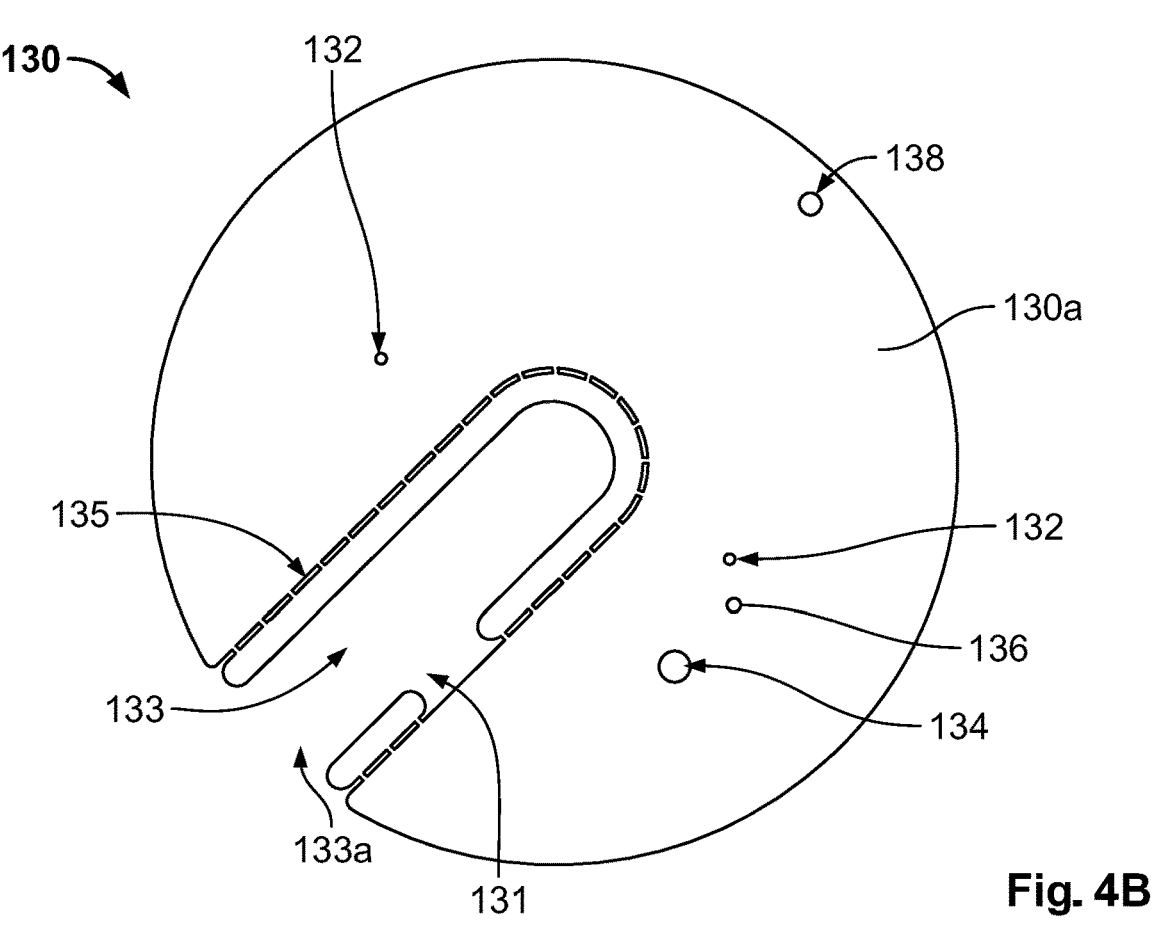
FIG. 4B is a top view of the bottom cover member of FIG. 4A.
Figure 4C:
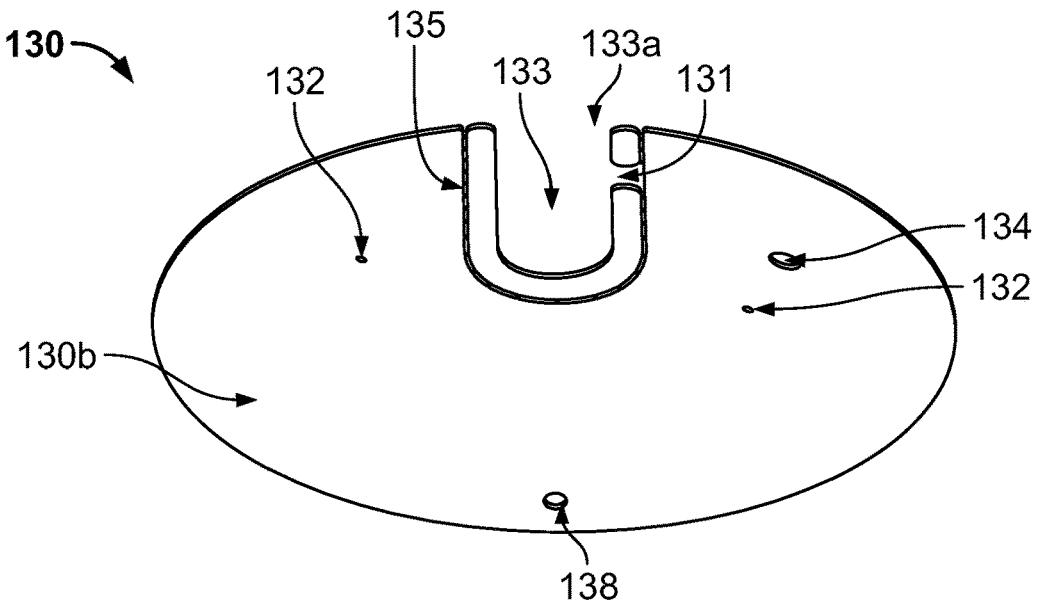
FIG. 4C is a bottom perspective view of the bottom cover member of FIG. 4A.

Referring now to FIGS. 4A-4C, the second (lower) cover member 130 of the wildlife guard assembly 100 of the present invention is shown in greater detail. The second cover member 130 has an outer surface 130a and an inner surface 130b. As shown in FIG. 4A, in some embodiments, the second cover member 130 has a generally truncated circular shape. An elongate slot 133 extends radially inwardly from an outer edge of the second cover member 130 (i.e., opening 133a) toward a center of the second cover member 130. The elongate slot 133 is sized and configured to receive a portion (e.g., the end cap 52) of the power distribution line insulator 50 (see, e.g., FIGS. 5A-5L). As shown in FIGS. 4A-4C, in some embodiments, the second cover member 130 may further comprises a recessed section 131 residing along an inner edge of the elongate slot 133. In some embodiments, the recessed section 131 may be configured to receive (and engage with) the locking mechanism 118 of the first cover member 110 to secure the wildlife guard assembly 100 on a power distribution line insulator 50 (see, e.g., FIGS. 5A-5L).

Similar to the first cover member 110, in some embodiments, the second cover member 130 may comprise a frangible or breakable connection such as a plurality of serrations 135. The plurality of serrations 135 may extend around the elongate slot 133 (i.e., adjacent to an outer periphery of the slot 133). The plurality of serrations 135 allows a technician to break away a segment of the elongate slot 133 to increase the size (e.g., a width W) of the slot 133, thereby allowing the assembly 100 to accommodate different sizes of insulators 50.

As shown in FIGS. 4A-4C, the second cover member 130 comprises an aperture 134 that is positioned to align with coupling component 114 of the first cover member 130 and configured to receive the fastener 60 therethrough. As discussed in further detail below, when the fastener 60 is inserted through the aperture 134 of the second cover member 130 and received by the coupling component 114 of the first cover member 110, the first cover member 110 becomes pivotably coupled to the second cover member 130 (i.e., hinge and pivot point H/P about the fastener 60), thereby allowing the first cover member 110 to move relative to the second cover member 130. In some embodiments, the first cover member 110 is movable (pivotable) in a first direction relative to the second cover member 130 to move the first cover member 110 into a closed position (see, e.g., FIGS. 5G-5I). In some embodiments, the coupling component 114, aperture 134, and fastener 60 together serve as both a hinge mechanism and a securing mechanism for the assembly 100. The hinge mechanism allows the first cover member 110 to move relative to the second cover member 130 and the securing mechanism locks the first cover member 110 in position relative to the second cover member 130 (i.e., when the fastener 60 is fully tightened).

In some embodiments, the second cover member 130 may comprise a stop member 136 extending upwardly from the outer surface 130a. The stop member 136 may be configured to prevent the first cover member 110 from moving (pivoting) too far in a second opposite direction D2 relative to the second cover member 130 (i.e., while in an open position).

Figure 7:
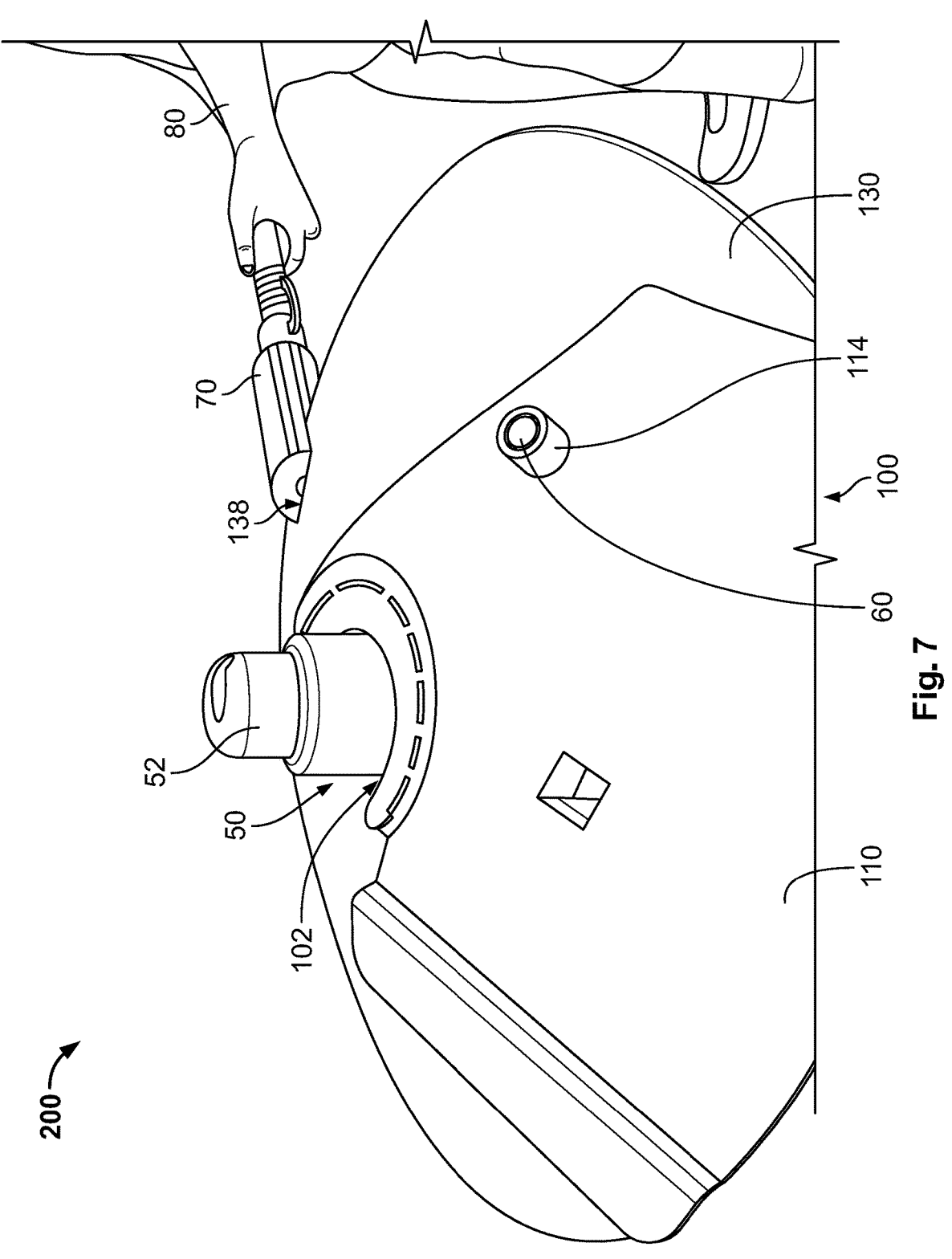
FIG. 7 illustrates the capability of the wildlife guard assembly of FIGS. 2A-2B to be installed onto a power distribution line insulator by one technician using a single hot-stick according to embodiments of the present invention.

In addition, the second cover member 130 further comprises a hot-stick feature 138. In the electric power distribution industry, a hot-stick is an insulated pole, usually made of fiberglass, used by electric utility workers when engaged on live-line working on energized high-voltage electric power lines, to protect them from electric shock. According to embodiments of the present invention, the hot-stick feature 138 on the second cover member 130 is configured to receive and/or engage with a hot-stick 70 during installation of the wildlife guard assembly 100. The hot-stick feature 138 allows a technician to use a hot-stick 70 to keep a safe distance when installing the wildlife guard assembly 100 on a power distribution line insulator 50. As shown in FIG. 7, according to embodiments of the present invention, the hot-stick feature 138 allows the wildlife guard assembly 100 to be installed by one technician 80 using a single hot-stick 70.

Figure 2A:
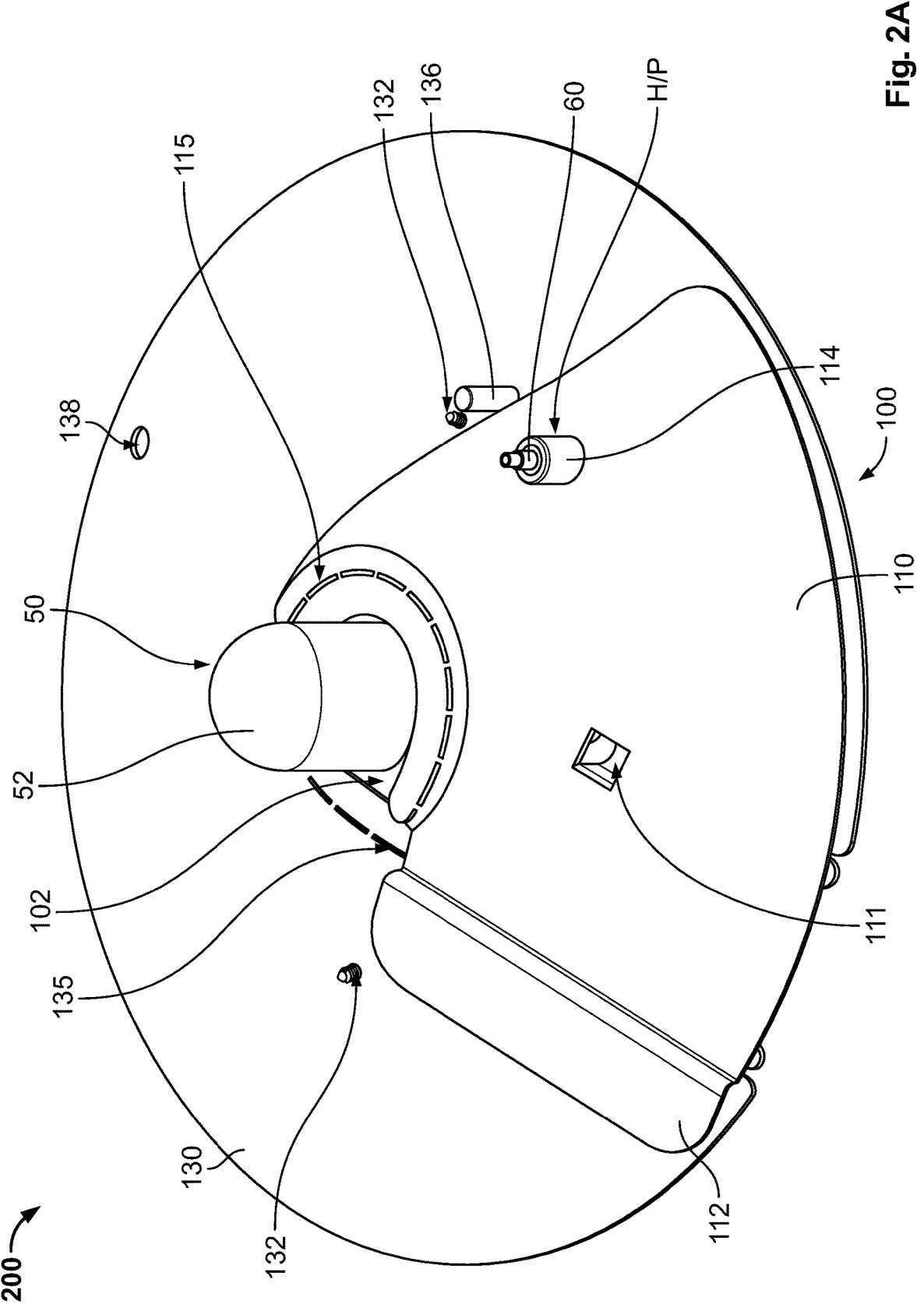
FIG. 2A is a top perspective view of a wildlife guard assembly mounted on a power distribution line insulator according to embodiments of the present invention.
Figure 2B:
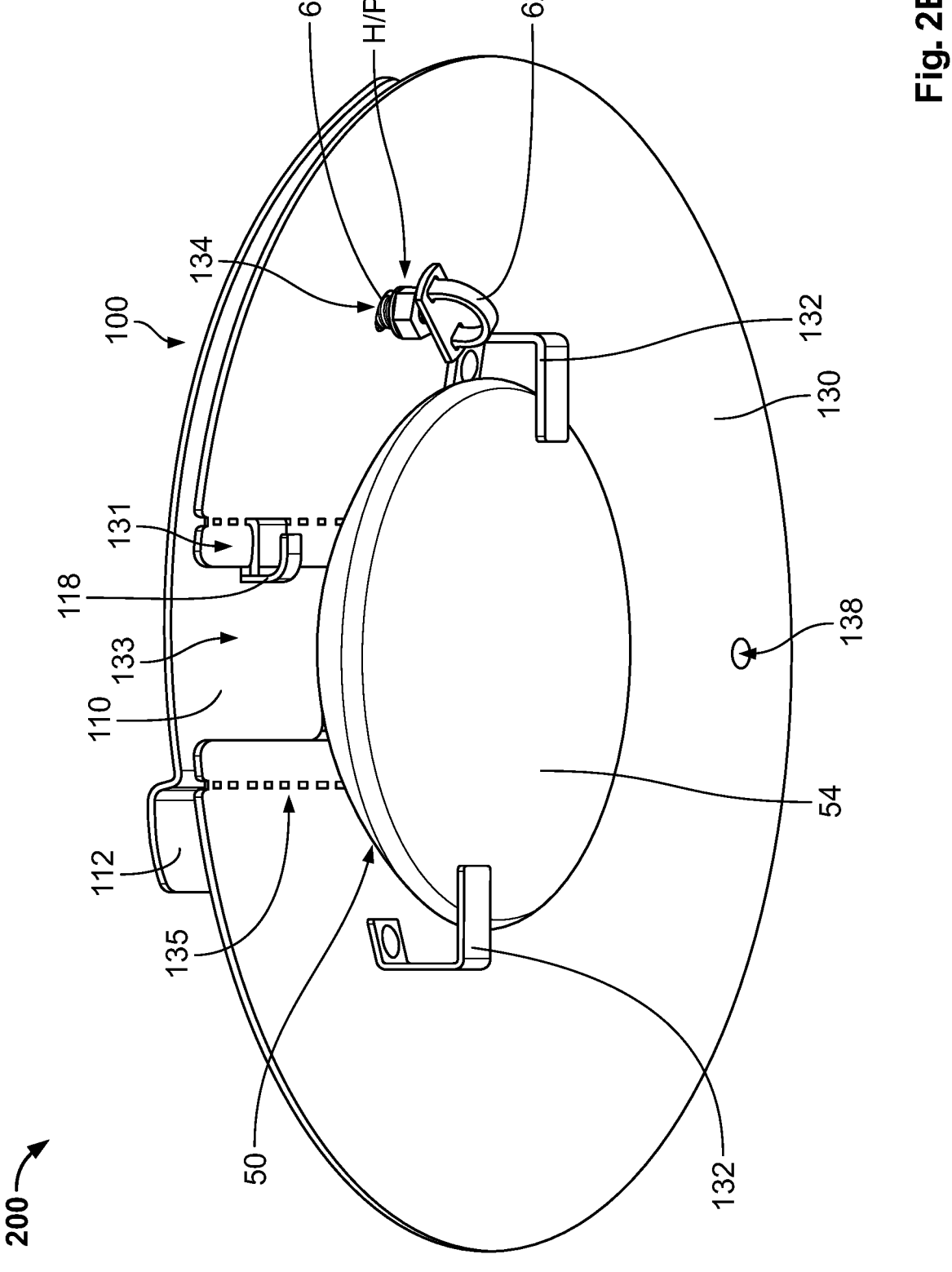
FIG. 2B is a bottom perspective view of the wildlife guard assembly of FIG. 2A.
Figure 2C:
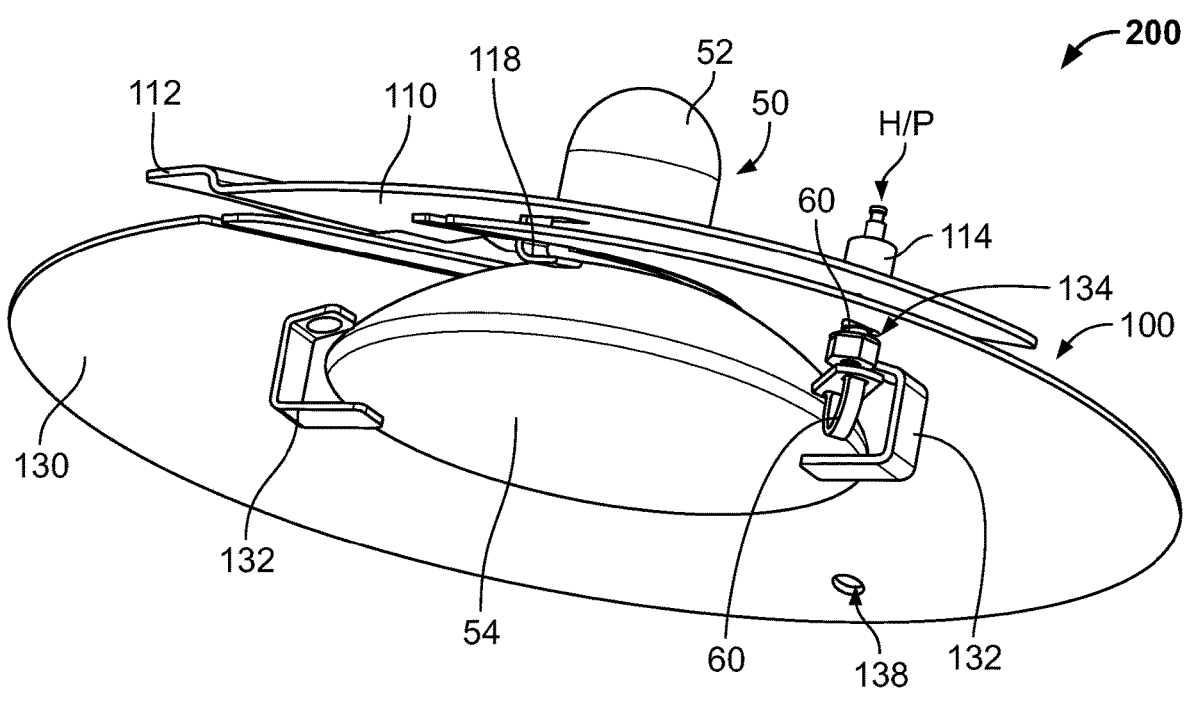
FIG. 2C is another bottom perspective view of the wildlife guard assembly of FIG. 2A.
Figure 2D:
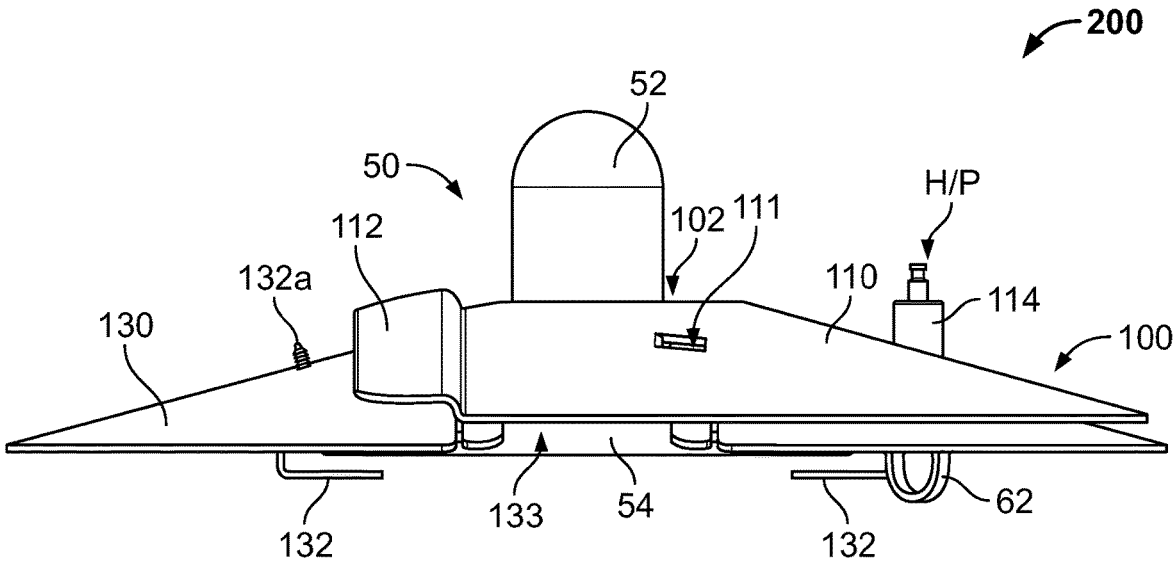
FIG. 2D is a side view of the wildlife guard assembly of FIG. 2A.

In many instances, the wildlife guard assembly 100 will be installed on elevated insulators that may be subject to windy conditions which could lift the assembly 100 off the power distribution line insulator 50. Thus, in some embodiments, as shown in FIG. 2B-2D, the second cover member 130 may further comprise one or more shed holding features 132. The shed holding features 132 may be coupled to or integral with the second cover member 130 and extend downwardly therefrom. In some embodiments, the shed holding features 132 may be secured to the second cover member 130 via a fastener 132a. The one or more shed holding features 132 are configured to engage or extend below a shed 54 of the power distribution line insulator 50. The one or more shed holding features 132 may help prevent or limit vertical movement of the wildlife guard assembly 100 relative to the insulator 50. For example, as shown in FIGS. 2B-2D, in some embodiments, the shed holding features 132 may comprise a latch or hook. The shed holding features 132 are configured to engage the shed 54 or are positioned underneath the shed 54, thereby helping prevent the wildlife guard assembly 100 from being lifted off the insulator 50, for example, by a gust of wind.

Figures 5A, 5B, 5C:
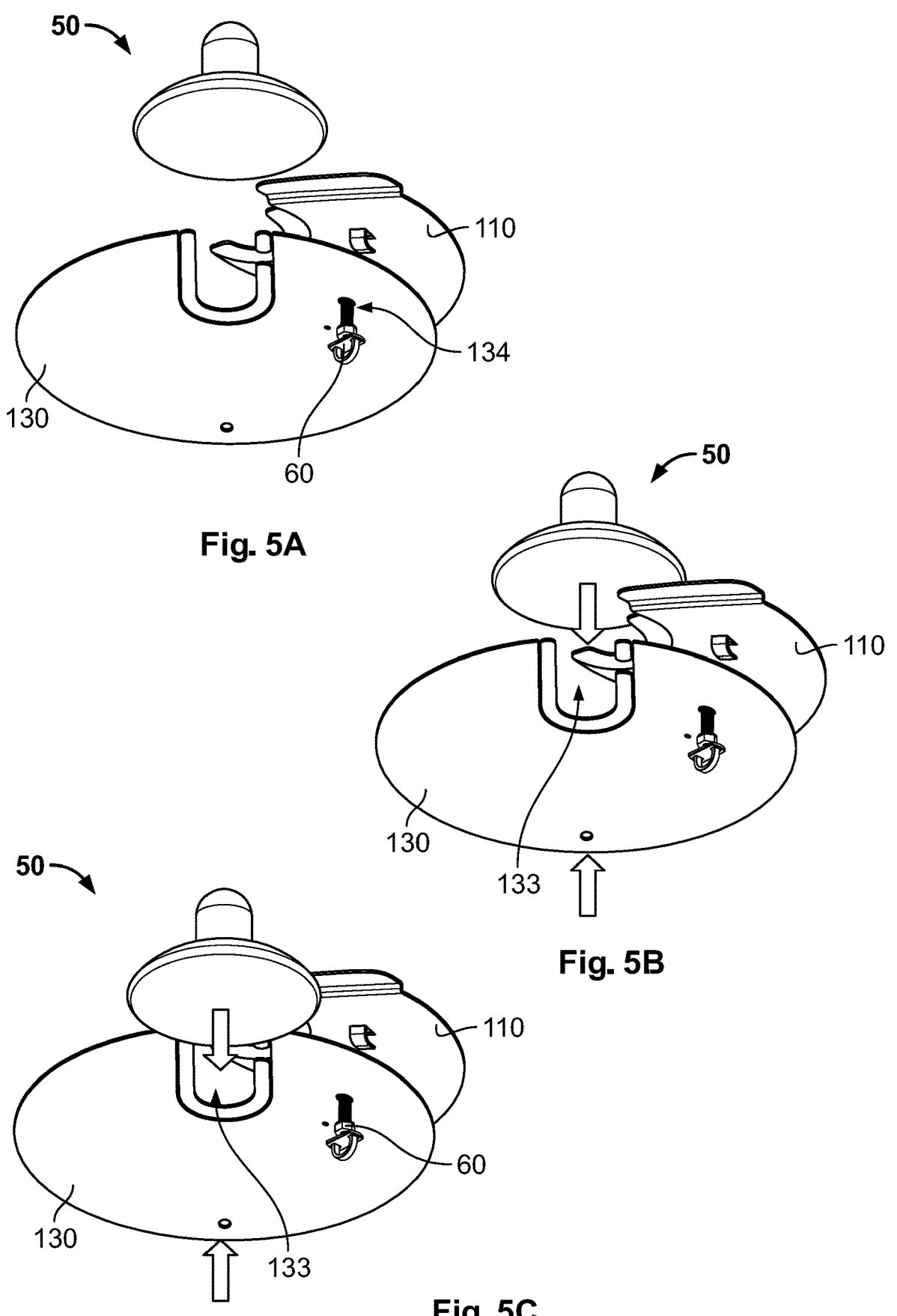
Figure 5G:
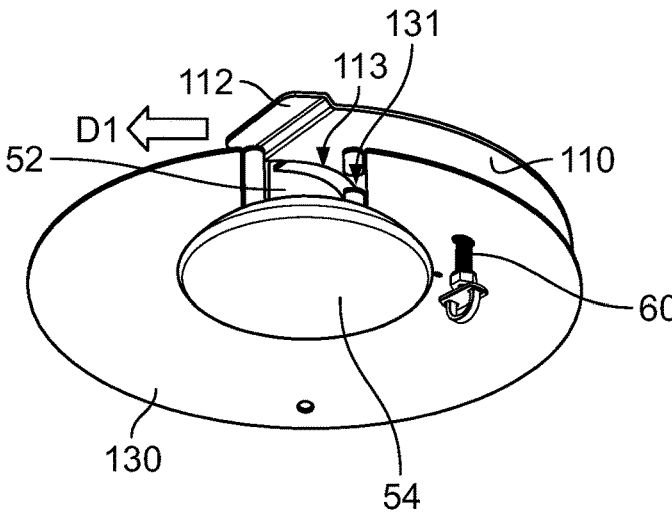
Figure 5H:
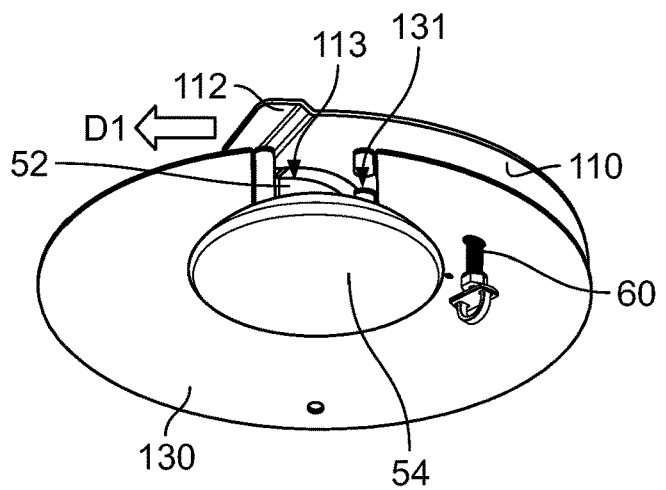
Figure 5I:
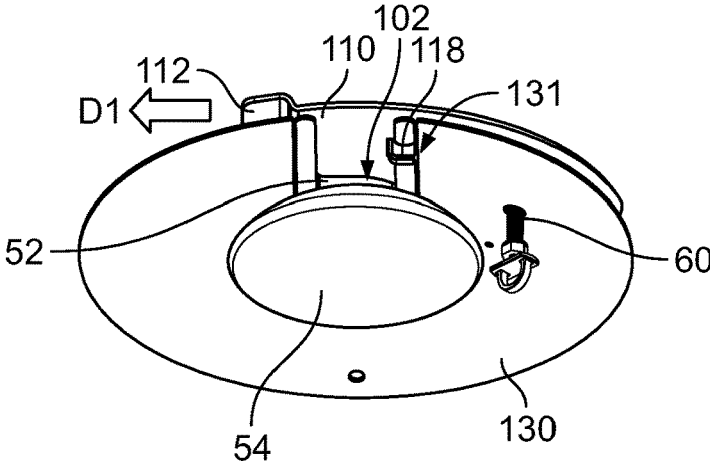
Figure 5J:
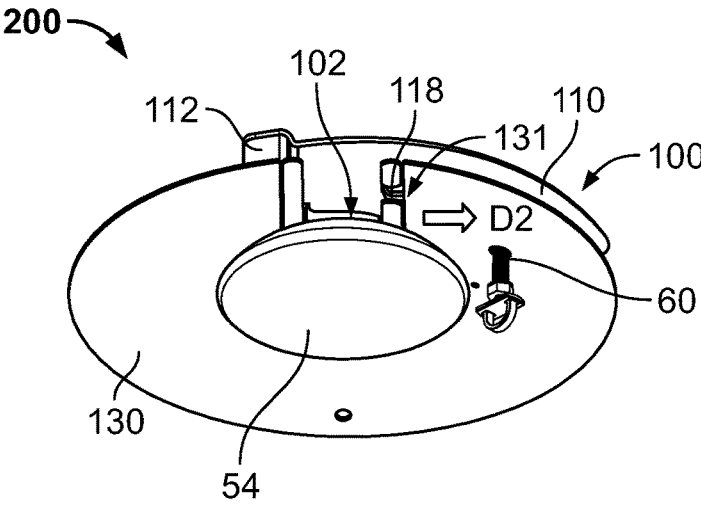

FIGS. 5A-5L and FIGS. 6A-6D illustrate an operation of installing the wildlife guard assembly 100 on a power distribution line insulator 50 according to embodiments of the present invention. As shown in FIG. 5A and FIG. 6A, a fastener 60 (e.g., a threaded bolt) has been inserted into the aperture 134 of the second cover member 130 of the wildlife guard assembly 100. The fastener 60 is received by the coupling component 114 of the first cover member 110 of the wildlife guard assembly 100 (see, e.g., FIG. 2A) to pivotably couple (i.e., the hinge and pivot point H/P) the first cover member 110 with the second cover member 130. In other words, the first cover member 110 is able to move or slide relative to the second cover member 130 using the fastener 60 as a pivot point (i.e., the hinge mechanism).

As shown in FIGS. 5A-5C and FIG. 6A, the first cover member 110 is pivoted to an "open" position relative to the second cover member 130 such that the assembly 100 has an open configuration (i.e., the first cover member 110 is positioned such that the open end 133a of the elongate slot 133 is accessible to receive a top end or end cap 52 of a power distribution line insulator 50). Next, the open end 133a elongate slot 133 of the second cover member 130 is aligned with the top end or end cap 52 of the power distribution line insulator 50. Using a hot-stick 70 that has been engaged with the hot-stick feature 138 on the second cover member 130 (see, e.g., FIG. 7), a technician pushes the wildlife guard assembly 100 toward the power distribution line insulator 50 as the end cap 52 of the insulator 50 is received through the open end 133a of the elongate slot 133 of the second cover member 130.

As shown in FIGS. 5D-5H and FIGS. 6B-6C, as the assembly 100 is pushed on the insulator 50, the end cap 52 of the insulator 50 slides within the elongate slot 133 until the end cap 52 engages the actuator portion 116 (i.e., recessed area 113) of the first cover member 110. Engagement of the end cap 52 with the actuator portion 116 causes the first cover member 110 to begin to pivot about the fastener 60 (i.e., the closure portion or flanged edge 112 of the first cover member 110 moves in a first direction D1 toward the elongate slot 133 of the second cover member 130) as the first cover member 110 begins to move from the open position to a closed position. As the wildlife guard assembly 100 is continued to be pushed toward the power distribution line insulator 50 (and the end cap 52 continues to slide within the elongate slot 133 toward a center of the second cover member 130), the first cover member 110 continues to pivot relative to the second cover member 130 and rotate around the end cap 52 of the insulator 50 to "capture" the end cap 52 of the insulator 50 within the central opening 102 defined by the first and second cover members 110, 130 (i.e., the opening 102 formed by the recessed area 113 of the first cover member 110 and a portion of the elongate slot 133 of the second cover member 130). In other words, the first cover member 110 is moved to a closed position relative to the second cover member 130 such that the first and second cover members 110, 130 surround the upper end or end cap 52 of the insulator 50.

As shown in FIG. 5G-5I and FIGS. 6B-6D, as the closure portion (i.e., flanged edge 112) of the first cover member 110 moves in the first direction D1 toward the elongate slot 133 of the second cover member 130, the axially offset distance H of the flanged edge 112 positions the end of the first cover member 110 on a different plane relative to an end of the second cover member 130, thereby allowing the flanged edge 112 of the first cover member 110 to slide over the end of the second cover member 130. In other words, flanged edge 112 of the first cover member 110 overlaps a portion of the second cover member 130 when the assembly 100 is in the closed configuration (see, e.g., FIGS. 5J-5K and FIG. 6D), thereby providing additional strength to the assembly 100 when in the closed configuration.

As shown in FIG. 5E-5I, as the first cover member 110 moves in the first direction D1 relative to the second cover member 130, the locking mechanism 118 of the first cover member 110 moves along the outer surface 130a of the second cover member 130. The first cover member 110 continues to move in the first direction D1 relative to the second cover member 130 (i.e., toward the elongate slot 133) until the locking mechanism 118 is received within the elongate slot 133 of the second cover member 130. In some embodiments, the locking mechanism 118 may be received by a recessed section 131 residing within the elongate slot 133 of the second cover member 130. Once received by the elongate slot 133, the first cover member 110 may pivot or move slightly in the second opposite direction D2 such that the locking mechanism 118 engages an inner edge of the elongate slot 133, thereby prohibiting the first cover member 110 from moving further in the second opposite direction D2 relative to the second cover member 130 (i.e., away from the elongate slot 133). In other words, the locking mechanism 118 maintains the assembly 100 in the closed configuration and installed on the power distribution line insulator 50. As shown in FIG. 5J, at the same time the locking mechanism 118 of the first cover member 110 is engaged within elongate slot 133 of the second cover member 130, the end cap 52 of the insulator 50 is positioned within the center opening 102 of the wildlife guard assembly 100 (see also, e.g., FIG. 6D and FIG. 7) and the assembly 100 is in the closed configuration.

Figure 5K:
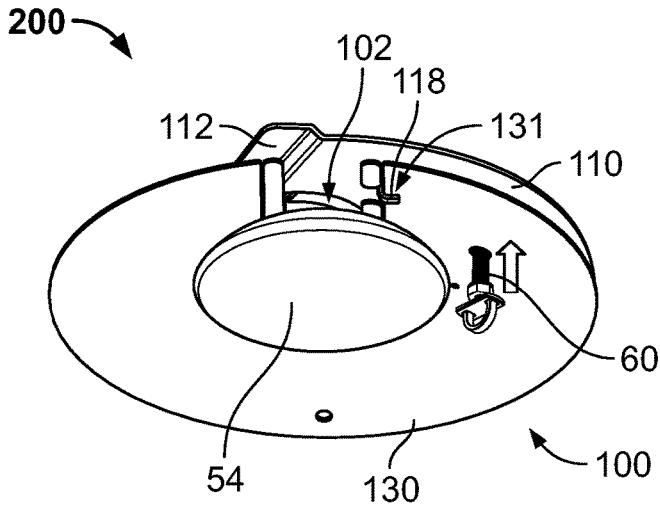
Figure 5L:
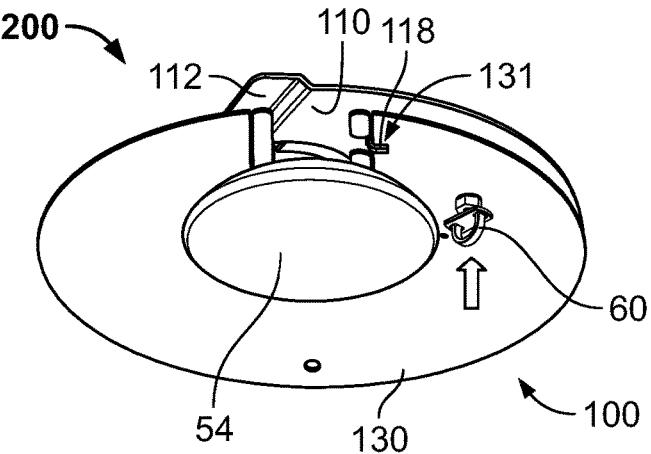
Figure 6C:
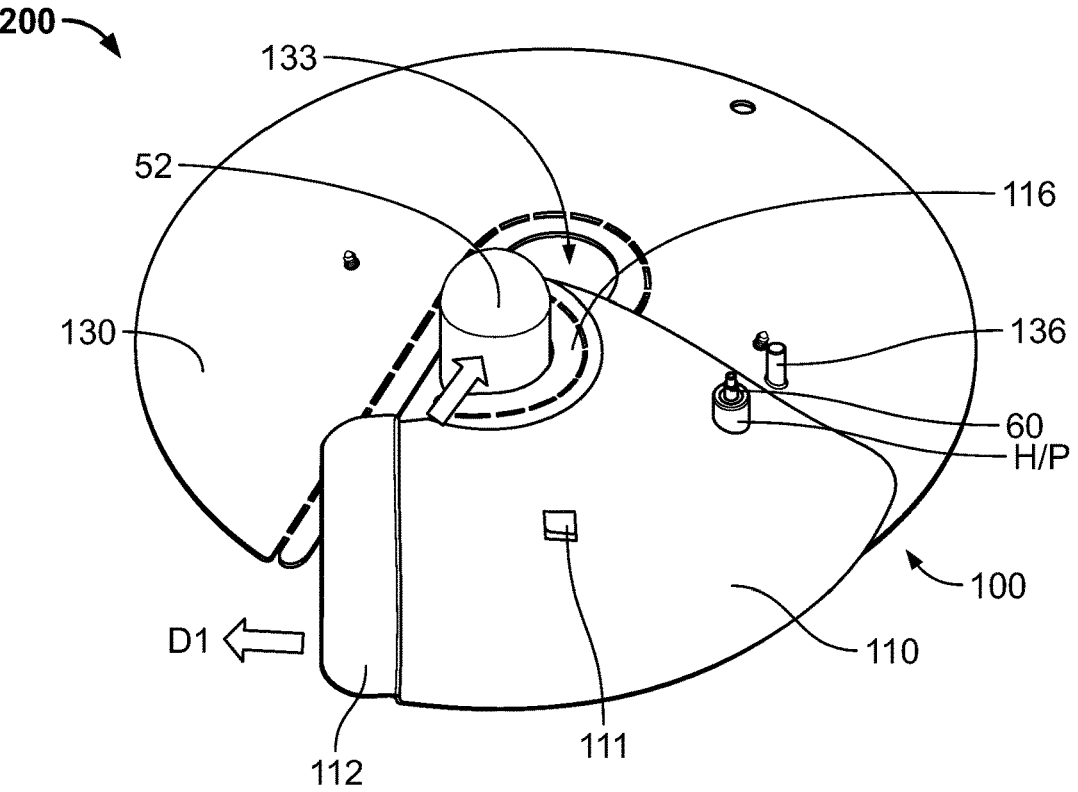
Figure 6D:
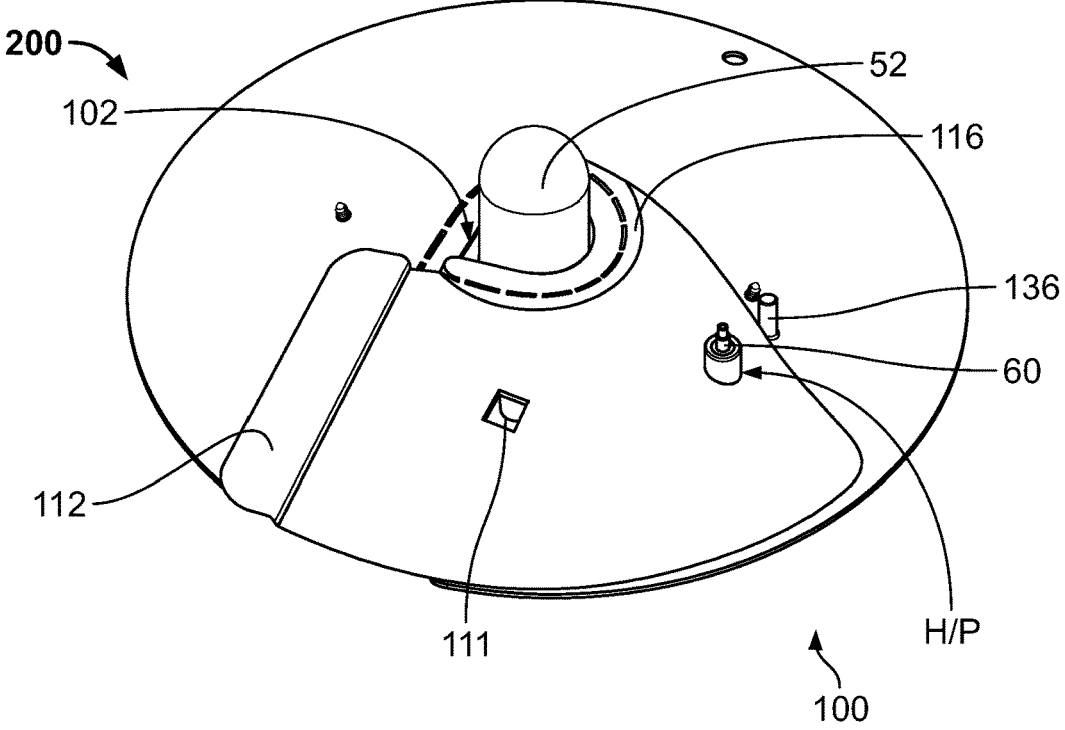

As shown in FIGS. 5K-5L, after the wildlife guard assembly 100 is positioned on the insulator 50, the fastener 60 is further tightened to the coupling component 114 (i.e., the securing mechanism), thereby locking the first cover member 110 in the closed position relative to the second cover member 130 and securing the assembly 100 on the power distribution line insulator 50 (i.e., in the closed configuration).

FIG. 7 illustrates the wildlife guard assembly 100 of the present invention being installed onto a power distribution line insulator 50 by one technician 80 using a single hot-stick 70 according to embodiments of the present invention, thereby allowing for easier installation at a reduced cost.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A wildlife guard assembly for a power distribution line insulator, the assembly comprising:
   a first cover member having an actuator portion configured to receive a portion of the power distribution line insulator and a closure portion; and
   a second cover member pivotably coupled to the first cover member, the second cover member having an elongate slot extending from an outer edge toward a center, the elongate slot configured to receive the portion of the power distribution line insulator;
   wherein the assembly is configured to receive the power distribution line insulator such that, when the portion of the power distribution line insulator is slid within the elongate slot of the second cover member and engages the actuator portion of the first cover member, the first cover member moves in a first circumferential direction relative to the second cover member until the closure portion overlaps the second cover member to secure the assembly on the power distribution line insulator.

2. The wildlife guard assembly according to claim 1, wherein the first cover member comprises a locking mechanism and an inner edge of the elongate slot of the second cover member is configured to engage with the locking mechanism to secure the assembly on the power distribution line insulator.

3. The wildlife guard assembly according to claim 1, wherein the first cover member comprises a coupling component and the second cover member comprises an aperture aligned with the coupling component, the aperture and coupling component configured to receive a fastener that pivotably couples the second cover member to the first cover member.

4. The wildlife guard assembly according to claim 1, wherein the second cover member comprises a hot-stick feature configured to engage a hot-stick during installation.

5. The wildlife guard assembly according to claim 1, wherein the actuator portion of the first cover member comprises a recessed area, wherein the first cover member further comprises a first frangible connection adjacent to the recessed area and the second cover member comprises a second frangible connection adjacent to the elongate slot, and wherein the first and second frangible connections allow the size of the recessed area and elongate slot to be adjusted to accommodate different sized power distribution line insulators.

6. The wildlife guard assembly according to claim 1, wherein the closure portion of the first cover member comprises a flanged edge that is axially offset a distance relative to an outer surface of the first cover member, wherein the offset distance positions the flanged edge of the first cover member on a different plane relative to an end of the second cover member such that the flanged edge of the first cover member overlaps the end of the second cover member when the assembly is installed on the power distribution line insulator.

7. The wildlife guard assembly according to claim 1, wherein the second cover member further comprises at least one shed holding feature configured to engage with a shed of the power distribution line insulator to limit vertical movement of the assembly relative to the power distribution line insulator.

8. A wildlife guard assembly for a power distribution line insulator, the assembly comprising:
   a first cover member having a recessed area configured to receive a portion of the power distribution line insulator, the first cover member comprising:
      a coupling component; and
      a locking mechanism extending downwardly therefrom;
   a second cover member coupled to the first cover member, the second cover member having an elongate slot extending from an outer edge toward a center, the elongate slot configured to receive the portion of the power distribution line insulator, the second cover member comprising:
      an aperture aligned with the coupling component of the first cover member; and
      a hot-stick feature configured to engage a hot-stick during installation; and
   a fastener extending through the aperture of the second cover member and engaged with the coupling component of the first cover member, wherein the fastener defines a pivot point which allows the first cover member to move in a first circumferential direction relative to the second cover member to secure the assembly on the power distribution line insulator.

9. The wildlife guard assembly according to claim 8, wherein when installed on the power distribution line insulator, the first and second cover members together form a disc that extends radially outwardly from an end cap of the power distribution line insulator.

10. The wildlife guard assembly according to claim 8, wherein the first and second cover members together define a central opening sized and configured to receive a portion of the power distribution line insulator, and wherein, when installed on the power distribution line insulator, the first and second cover members surround the portion of the power distribution line insulator.

11. The wildlife guard assembly according to claim 8, wherein the first cover member comprises a first frangible connection adjacent to the recessed area and the second cover member comprises a second frangible connection adjacent to the elongate slot, and wherein the first and second frangible connections allow the size of the recessed area and elongate slot to be adjusted to accommodate different sized power distribution line insulators.

12. The wildlife guard assembly according to claim 8, wherein the first cover member comprises a flanged edge that is axially offset a distance relative to an outer surface of the first cover member, wherein the offset distance positions the flanged of the first cover member on a different plane relative to an end of the second cover member such that the flanged edge of the first cover member overlaps the end of the second cover member when the assembly is installed on the power distribution line insulator.

13. The wildlife guard assembly according to claim 8, wherein the locking mechanism of the first cover member is an L-shaped hook or latch configured to engage with an inner edge of the elongate slot of the second cover member.

14. The wildlife guard assembly according to claim 8, wherein the second cover member further comprises a stop member extending upwardly therefrom, the stop member configured to prevent the first cover member from moving too far in a second opposite direction relative to the second cover member.

15. The wildlife guard assembly according to claim 8, wherein the second cover member further comprises at least one shed holding feature configured to engage with a shed of the power distribution line insulator to limit vertical movement of the assembly relative to the power distribution line insulator.

16. The wildlife guard assembly according to claim 8, wherein the coupling component of the first cover member, the aperture of the second cover member, and the fastener together define a hinge mechanism and a securing mechanism of the assembly.

17. The wildlife guard assembly according to claim 12, wherein the locking mechanism and the flanged edge of the first cover member together form an interlocking mechanism that engages with the second cover member.

18. A method for installing a wildlife guard assembly onto a power distribution line insulator, the wildlife guard assembly comprising a first cover member pivotably coupled to a second cover member, the first cover member having a recessed area and the second cover member having an elongate slot, the method comprising:

aligning a top end of the power distribution line insulator with an opening of the elongate slot of the second cover member;

using a hot-stick, pushing the wildlife guard assembly such that the top end of the power distribution line insulator is received within the elongate slot of the second cover member and engages the first cover member within the recessed area;

continuing to push the wildlife guard assembly such that the first cover member moves in a first circumferential direction relative to the second cover member until a locking mechanism of the first cover member engages an inner edge of the elongate slot of the second cover member; and securing the second cover member to the first cover member with a fastener to secure the wildlife guard assembly on the power distribution line insulator.

19. The method according to claim 18, wherein the first cover member comprises a first frangible connection adjacent to the recessed area and the second cover member comprises a second frangible connection adjacent to the elongate slot, the method further comprising breaking the first and second frangible connections to create a larger recessed area and elongate slot to accommodate a larger sized power distribution line insulator.

20. The method according to claim 18, wherein the wildlife guard assembly is installed on the power distribution line insulator by one technician utilizing a single hot-stick.

\* \* \* \* \*